US012767743B2

(12) United States Patent
Baillie et al.

(10) Patent No.: US 12,767,743 B2
(45) Date of Patent: Oct. 20, 2026

(54) CHEMICALLY CONVERTED CATALYSTS

(71) Applicant: Dow Global Technologies LLC, Midland, MI (US)

(72) Inventors: Rhett A. Baillie, Pearland, TX (US); Bethany M. Neilson, Manvel, TX (US); Roger L. Kuhlman, Lake Jackson, TX (US); John F. Szul, Hurricane, WV (US)

(73) Assignee: Dow Global Technologies LLC, Midland, MI (US)

( * ) Notice: Subject to any disclaimer, the term of this patent is extended or adjusted under 35 U.S.C. 154(b) by 943 days.

(21) Appl. No.: 17/928,168

(22) PCT Filed: May 28, 2021

(86) PCT No.: PCT/US2021/034765

§ 371 (c)(1),
(2) Date: Nov. 28, 2022

(87) PCT Pub. No.: WO2021/243158

PCT Pub. Date: Dec. 2, 2021

(65) Prior Publication Data

US 2023/0203218 A1 Jun. 29, 2023

Related U.S. Application Data

(60) Provisional application No. 63/169,581, filed on Apr. 1, 2021, provisional application No. 63/081,538, filed on Sep. 22, 2020, provisional application No. 63/081,533, filed on Sep. 22, 2020, provisional application No. 63/031,638, filed on May 29, 2020.

(51) Int. Cl.

| | |
|---|---|
| ***C08K 5/03*** | (2006.01) |
| ***C08F 2/34*** | (2006.01) |
| ***C08F 2/44*** | (2006.01) |
| ***C08F 4/76*** | (2006.01) |
| ***C08F 210/16*** | (2006.01) |
| ***C08K 5/56*** | (2006.01) |

(52) U.S. Cl.

CPC .............. *C08F 210/16* (2013.01); *C08F 2/34* (2013.01); *C08F 2/44* (2013.01); *C08F 4/76* (2013.01); *C08K 5/03* (2013.01); *C08K 5/56* (2013.01)

(58) Field of Classification Search

None

See application file for complete search history.

(56) References Cited

U.S. PATENT DOCUMENTS

| | | | | |
|---|---|---|---|---|
| 5,705,578 | A * | 1/1998 | Peifer | C08F 10/00 526/127 |
| 6,995,219 | B2 * | 2/2006 | Follestad | C08F 4/65912 526/204 |
| 9,211,937 | B2 * | 12/2015 | Chen | B62K 21/00 |
| 9,221,937 | B2 | 12/2015 | Savatsky et al. | |
| 2015/0011701 | A1 * | 1/2015 | Matsushita | C08F 36/08 526/340.2 |
| 2022/0049032 | A1 | 2/2022 | Neilson et al. | |

FOREIGN PATENT DOCUMENTS

| | | |
|---|---|---|
| CN | 1317503 | * 10/2001 |

OTHER PUBLICATIONS

Wang et al. Advances in High-Temperature Non-metallocene Catalysts for Polyolefin Elastomers. Materials. 18, 1334. 2025 (Year: 2025).*

International Search Report and Written Opinion for related PCT Application No. PCT/US2021/034765, mailed Sep. 21, 2021 (12 pgs).

International Preliminary Report on Patentability for related PCT Application No. PCT/US2021/034765, mailed Dec. 8, 2022 (8 pgs).

* cited by examiner

*Primary Examiner* — Sheng H Davis

(57) ABSTRACT

Embodiments of the present disclosure directed towards converting a non-metallocene precatalyst into a productivity enhanced non-metallocene catalyst. As an example, the present disclosure provides a method of making an productivity enhanced non-metallocene catalyst, the method comprising combining a first non-metallocene precatalyst, an effective amount of an activator, and an effective amount of a productivity-increasing organic compound under conditions effective for the activator and the productivity-increasing organic compound to chemically convert the first non-metallocene precatalyst into the productivity enhanced non-metallocene catalyst; wherein the productivity-increasing organic compound is of formula (A), as detailed herein.

10 Claims, No Drawings

CHEMICALLY CONVERTED CATALYSTS

This application is a National Stage Application under 35 U.S.C. § 371 of International Application Number PCT/US2021/034765, filed May 28, 2021 and published as WO 2021/243158 on Dec. 2, 2021, which claims the benefit to U.S. Provisional Application's 63/169,581, filed Apr. 1, 2021, 63/081,533, filed Sep. 22, 2020, 63/081,538, filed Sep. 22, 2020, and 63/031,638, filed May 29, 2020, the entire contents of which are incorporated herein by reference in its entirety

INTRODUCTION

Polymers may be utilized for a number of products including films and pipes, among other types of products. Polymers can be made in the presence of a catalyst via a polymerization reaction. Productivity of a catalyst can be determined as a ratio of mass of a polymer (e.g., polyethylene) produced per mass of catalyst used in the polymerization reaction.

SUMMARY

Various methods can be employed to adjust or control polymerization reaction conditions. Adjusting polymerization reaction conditions can alter catalyst productivity. However, altering reaction conditions may have other unintended consequences. For instance, altering reaction conditions can also alter various polymer properties (e.g., Mn, Mw, density, etc.), impart operability issues (e.g., agglomeration, sheeting, etc.), increase catalyst residue in the polymer, and/or increase production cost. Thus, there remains a need for methods of adjusting or controlling catalyst productivity which do not require changing polymerization reaction conditions.

Our technical solution to the above technical problems employs an effective amount of a productivity-increasing organic compound to alter the molecular structure of a non-metallocene precatalyst into a productivity enhanced non-metallocene catalyst. The productivity enhanced non-metallocene catalyst and/or a catalyst system (e.g., a multimodal catalyst system) including the productivity enhanced non-metallocene catalyst can be employed in a polymerization reactor to make polymers at an improved level of productivity, as detailed herein, and yet the productivity enhanced non-metallocene catalysts are easily and inexpensively prepared and still make polymer with desired properties (e.g., molecular weight, etc.). This result is not predictable.

DETAILED DESCRIPTION

The entire contents of the SUMMARY section are incorporated here by reference. Additional embodiments follow; some are numbered for easy reference.

Aspect 1. A method of making an productivity enhanced non-metallocene catalyst, the method comprising combining a first non-metallocene precatalyst, an effective amount of an activator, and an effective amount of a productivity-increasing organic compound under conditions effective for the activator and the productivity-increasing organic compound to chemically convert the first non-metallocene precatalyst into the productivity enhanced non-metallocene catalyst; wherein the productivity-increasing organic compound is of formula (A):

(formula A)

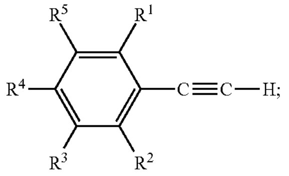

wherein each of $R^5$, $R^4$ and $R^3$ independently is H, a halogen, or a $(C_1\text{-}C_{20})$hydrocarbyl; with the proviso that at least one of $R^5$ and $R^3$ is a halogen or a haloalkyl; wherein each of $R^2$ and $R^1$ independently is H, a halogen, or a $(C_1\text{-}C_{20})$hydrocarbyl, wherein each $(C_1\text{-}C_{20})$hydrocarbyl independently is unsubstituted or substituted with from 1 to 4 substituent groups $R^S$; wherein each substituent group $R^S$ is independently selected from halogen, unsubstituted $(C_1\text{-}C_5)$alkyl, —C≡CH, —OH, $(C_1\text{-}C_5)$alkoxy, —C(═O)-(unsubstituted $(C_1\text{-}C_5)$alkyl), —$NH_2$, —N(H)(unsubstituted $(C_1\text{-}C_5)$alkyl), —N(unsubstituted $(C_1\text{-}C_5)$alkyl$)_2$, —COOH, —C(═O)—$NH_2$, —C(═O)—N(H)(unsubstituted $(C_1\text{-}C_5)$alkyl), —C(═O)—N(unsubstituted $(C_1\text{-}C_5)$alkyl$)_2$, —S-(unsubstituted $(C_1\text{-}C_5)$alkyl), —S(═O$)_2$-(unsubstituted $(C_1\text{-}C_5)$alkyl), —S(═O$)_2$—$NH_2$, —S(═O$)_2$—N(H)(unsubstituted $(C_1\text{-}C_5)$alkyl), —S(═O$)_2$—N(unsubstituted $(C_1\text{-}C_5)$alkyl$)_2$, —C(═O)S-(unsubstituted $(C_1\text{-}C_5)$alkyl) and —COO(unsubstituted $(C_1\text{-}C_5)$alkyl). Examples of suitable halogens and haloalkyls for $R^3$, $R^4$, and/or $R^5$ include but are not limited to F, $CF_3$, $CF_2CF_3$, Cl, $CCl_3$, $CCl_2CCl_3$, Br, $CBr_3$, $CBr_2CBr_3$, I, $CI_3$, $CI_2CI_3$, etc.

Aspect 2. The method of aspect 1 wherein one of $R^5$ and $R^3$ is a halogen and the other of $R^5$ and $R^3$ is H or a $(C_1\text{-}C_{20})$hydrocarbyl; or wherein each of $R^5$ and $R^3$ is a halogen or a haloalkyl. In one or more embodiments $R^5$ is a halogen and $R^3$ is a hydrogen, or $R^5$ is a hydrogen and $R^3$ is a halogen. In one or more embodiments $R^5$ is fluorine and $R^3$ is hydrogen, or $R^5$ is hydrogen and $R^3$ is fluorine. In one more embodiments $R^5$ is a halogen and $R^3$ is halogen. In such embodiments $R^5$ and $R^3$ can be the same or different halogen. For instance, in one or more embodiments $R^5$ is fluorine and $R^3$ is fluorine (a fluoro group), chlorine (a chloro group), bromine (a bromo group), and/or iodine (an iodo group). In some embodiments $R^5$ and $R^3$ can be haloalkyls. $R^5$ and $R^3$ can be the same or different haloalkyl. For instance, in one or more embodiments $R^5$ is trifluoromethyl and $R^3$ is trifluoromethyl.

Aspect 3. The method of any one of aspects 1 to 2 wherein each of $R^2$ and $R^1$ is H.

Aspect 4. The method of any one of aspects 1 to 3 wherein $R^4$ is a halogen or H. In one or more embodiments $R^4$ is a halogen. In one or more embodiments $R^4$ is fluorine (a fluoro group), chlorine (a chloro group), or bromine (a bromo group), and/or iodine (an iodo group). In one or more embodiments, $R^4$ is fluorine. In one or more embodiments $R^4$ is hydrogen (H).

Aspect 5. The method of aspect 1 wherein the productivity-increasing organic compound is selected from a group consisting of 1-ethynyl-3-fluorobenzene; productivity-increasing organic compound (PIC1), 1-ethynyl-3,5-difluorobenzene; productivity-increasing organic compound (PIC2), 4-ethynl-1,2-difluorobenzene; productivity-increasing organic compound (PIC3), and 1-ethynyl-3,5-bis(trifluoromethyl)benzene; productivity-increasing organic compound (PIC4). In one or more embodiments the productivity-increasing organic compound is defined by any one of limitations (i) to (v): (i) the productivity-increasing organic compound is 1-ethynyl-3-fluorobenzene; (ii) the productivity-increasing organic compound is 1-ethynyl-3,5-difluorobenzene; (iii) the productivity-increasing organic compound is 4-ethynl-1,2-difluorobenzene; (iv) the productivity-increasing organic compound is 1-ethynyl-3,5-bis(trifluoromethyl)benzene; (v) a combination of any two or more of limitations (i) to (iv).

Aspect 6. The method of any one of aspects 1 to 5 wherein the method further comprises combining the first non-metallocene precatalyst, the effective amount of an activator, the effective amount of a productivity-increasing organic compound, a support material, and an inert hydrocarbon solvent to make a mixture, and removing the inert hydrocarbon solvent from the mixture so as to give the productivity enhanced non-metallocene catalyst disposed on the support material.

Aspect 7. The method of any one of aspects 1 to 6 wherein the order of the combining step comprises any one of limitations (i) to (iv): (i) combining the first non-metallocene precatalyst with the effective amount of the activator to give a first intermediate mixture that is free of the productivity-increasing organic compound, and then combining the first intermediate mixture with the productivity-increasing organic compound; (ii) combining the first non-metallocene precatalyst with the effective amount of the productivity-increasing organic compound to give a second intermediate mixture, and then combining the second intermediate mixture with the effective amount of the activator; (iii) combining the effective amount of the activator with the effective amount of the productivity-increasing organic compound to give a third intermediate mixture that is free of the first non-metallocene precatalyst, and then combining the third intermediate mixture with the first non-metallocene precatalyst; and (iv) simultaneously combining the first non-metallocene precatalyst, the effective amount of the activator, and the effective amount of the productivity-increasing organic compound.

Aspect 8. The method of any one of aspects 1 to 7 wherein the first non-metallocene precatalyst is a non-metallocene precatalyst of formula (I)

(formula I)

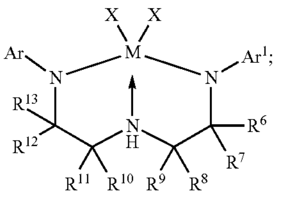

wherein M is a group 4 element, each of $R^6$-$R^{13}$ are independently a hydrogen or a methyl group, Ar is an aryl group or a substituted aryl group, Ar' is an aryl group or a substituted aryl group, and each X is, independently, a hydride group, an amide, a benzyl group, a methyl group, a chloro group, a fluoro group, a methylene(trimethylsilyl) group, a hydrocarbyl group, or a heterohydrocarbyl group. One or more embodiments provide that each X is independently a silicon-containing alkyl. One or more embodiments provide that each X is independently a tri-hydrocarbylsilylmethyl. One or more embodiments provide that each X is independently a methylene(trimethylsilyl) group.

Aspect 9. The method of any one of aspects 1 to 8 wherein the first non-metallocene precatalyst of formula (I) is of compound (1), (1)

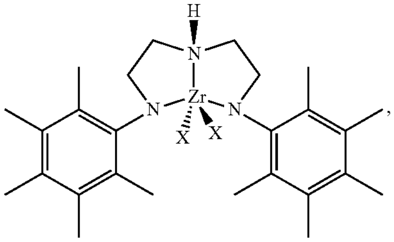

, wherein each X is, independently, a hydride group, an amide, a benzyl group, a methyl group, a chloro group, a fluoro group, a methylene(trimethylsilyl) group, a hydrocarbyl group, or a heterohydrocarbyl group. One or more embodiments provide that each X is independently a silicon-containing alkyl. One or more embodiments provide that each X is independently a tri-hydrocarbylsilylmethyl. One or more embodiments provide that each X is independently a methylene(trimethylsilyl) group. In one or more embodiments the first non-metallocene precatalyst of formula (I) can be compound (1), and each X can be a benzyl group.

Aspect 10. The method of any one of aspects 1 to 9 wherein the metal of the first non-metallocene precatalyst is M, wherein the activator is an organoaluminum compound, and wherein the effective amount of the activator is an Al/M molar ratio of from 0.5 to 10,000, alternatively from 0.95 to 200, alternatively from 1.0 to 150, alternatively from 10 to 100; and/or wherein the effective amount of the productivity-increasing organic compound comprises a molar ratio of productivity-increasing organic compound-to-first non-metallocene precatalyst (PIC/NMC molar ratio) of from 0.5:1.0 to 50.0:1.0, alternatively from 0.9:1.0 to 20.0:1.0, alternatively from 0.9:1.0 to 11:1.0, alternatively from 0.95:1.0 to 6:1.0.

Aspect 11. A productivity enhanced non-metallocene catalyst made by the method of any one of aspects 1 to 10.

Aspect 12. The productivity enhanced non-metallocene catalyst of aspect 11 wherein a comparative non-metallocene catalyst, made from the first non-metallocene precatalyst and activator in absence of the productivity-increasing organic compound, under the same polymerization conditions has a productivity of x, and the productivity enhanced non-metallocene catalyst has a productivity of 1.1x to 10.0x, from 7.5x, from 1.1x to 5.5x, from 1.1x to 4.5x, from 1.1 to 3.5x, from 1.1x to 3.3x or from 1.6x to 3.3x. For instance, in some embodiments the productivity enhanced non-metallocene catalyst has a productivity that is 1.1x, 1.2x, 1.3x, 1.4x, 1.5x, 1.6x, 1.7x, 1.8x, 1.9x, 2.0x, 2.1x, 2.2x, 2.3x, 2.4x, 2.5x, 2.6x, 2.7x, 2.8x, 2.9x, 3.0x, 3.1x, 3.2x or 3.3x, among other possible values.

In some embodiments the productivity enhanced non-metallocene catalyst can have a productivity that is greater than 9,000, greater than 9,500, greater than 9,700, greater than 10,000, or greater than 10,500. In some embodiments the productivity can be in a range from 9,000 to 60,000, in a range of from 9,000 to 50,000, 9,000 to 40,000, 9,000 to 30,000, 9,000 to 20,000, 9,000 to 17,000, in a range from 9,000 to 15,000, in a range from 9,000 to 12,000, in a range from 9,000 to 11,000, in a range from 9,500 to 20,000, in a range from 9,500 to 15,000, in a range from 9,500 to 12,000, in a range from 9,500 to 11,000, in a range from 9,700 to 20,000, in a range from 9,700 to 15,000, in a range from 9,700 to 12,000, or in a range from 9,700 to 11,000, among other possible values.

Aspect 13. A method of feeding a productivity enhanced non-metallocene catalyst to a slurry-phase, solution-phase, or gas-phase polymerization reactor containing an olefin monomer and a moving bed of polyolefin polymer, the method comprising making the productivity enhanced non-metallocene catalyst outside of the reactor and according to the method of any one of aspects 1 to 10, and feeding the productivity enhanced non-metallocene catalyst in neat form or as a solution or slurry thereof in an inert hydrocarbon liquid through a feed line free of olefin monomer into the slurry-phase, solution-phase, or gas-phase polymerization reactor.

Aspect 14. A multimodal catalyst system comprising the enhanced productivity non-metallocene catalyst made by the method of any one of aspects 1 to 10, and at least one second catalyst selected from a metallocene catalyst and a different non-metallocene catalyst.

Aspect 15. A method of making a polyolefin polymer, the method comprising contacting at least one 1-alkene monomer with the productivity enhanced non-metallocene catalyst made by the method of any one of aspects 1 to 10, or the multimodal catalyst system of aspect 14, in a slurry-phase, solution-phase, or gas-phase polymerization reactor under polymerizing conditions, thereby making the polyolefin polymer.

Aspect 16. A polyolefin polymer made by the aspect of making a polyolefin polymer of Aspect 15. Embodiments provide that the polymer can have an Mn (number average molecular weight) from 10,000 to 250,000. Embodiments provide that the polymer can have a Mw (weight average molecular weight) from 50,000 to 1,000,000. Embodiments provide that the polymer can have a Mz (z-average molecular weight) from 500,000 to 5,000,000. Embodiments provide that the polymer can have a Mz to Mw ratio in a range of from 2.00 to 20.00. In some embodiments the polymer can have a value of Mw to Mn ratio that is greater than 2.00, greater than 3.00, greater than 4.00, or greater than 5.00. Some embodiments provide that the polymer can have an Mw to Mn ratio in a range of from 5.00 to 75.00 or from 5.00 to 50.00. Embodiments provide that the polymer can have a Mz to Mw ratio that is less than a Mw to Mn ratio of the polymer. Embodiments provide that the polymer made utilizing a gas-phase polymerization reactor can have melt temperature (Tm) from 110 to 135 degrees Celsius (° C.).

Aspect 17. A manufactured article made from the polyolefin polymer of aspect 16.

The method of chemically converting a first non-metallocene precatalyst into a productivity enhanced non-metallocene catalyst. The method comprises combining in any order constituents consisting essentially of a first non-metallocene precatalyst, an effective amount of an activator, and an effective amount of a productivity-increasing organic compound under conditions effective for the activator and the productivity-increasing organic compound to chemically convert the first non-metallocene precatalyst into a productivity enhanced non-metallocene catalyst, thereby making the productivity enhanced non-metallocene catalyst. The productivity-increasing organic compound may be of formula (A), as detailed herein. The first non-metallocene precatalyst may be a non-metallocene precatalyst of formula (I), as detailed herein. In some embodiments metal M is Zr or Hf; alternatively M is Zr or Ti; alternatively M is Ti or Hf; alternatively M is Zr; alternatively M is Hf; alternatively M is Ti.

Embodiments of the method of making may comprise any one of synthetic schemes 1 to 12.

Synthesis Scheme 1: Step (a) non-metallocene precatalyst+excess activator→intermediate mixture of activated non-metallocene catalyst+leftover activator. Step (b) intermediate mixture+effective amount of productivity-increasing organic compound→productivity enhanced non-metallocene catalyst+the leftover activator.

Synthesis Scheme 2: Step (a) non-metallocene precatalyst+effective amount of productivity-increasing organic compound→intermediate non-metallocene precatalyst (unreacted mixture or reaction product of non-metallocene precatalyst+productivity-increasing organic compound). Step (b) intermediate non-metallocene precatalyst+activator (e.g., an alkylaluminoxane such as methylaluminoxane ("MAO"))→productivity enhanced non-metallocene catalyst.

Synthesis Scheme 3: Step (a) non-metallocene precatalyst+activator (e.g., an alkylaluminoxane such as methylaluminoxane ("MAO"))→activated non-metallocene catalyst. Step (b) activated non-metallocene catalyst+effective amount of productivity-increasing organic compound→productivity enhanced non-metallocene catalyst.

Synthesis Scheme 4: Step (a) activator (e.g., an alkylaluminoxane such as methylaluminoxane ("MAO"))+effective amount of productivity-increasing organic compound→intermediate mixture. Step (b) Intermediate mixture+non-metallocene precatalyst→productivity enhanced non-metallocene catalyst.

Synthesis Scheme 5: Step (a) activator→non-metallocene precatalyst←effective amount of productivity-increasing organic compound (simultaneous but separate additions of activator and productivity-increasing organic compound to non-metallocene precatalyst)→productivity enhanced non-metallocene catalyst. Step (b): none.

Synthesis Scheme 6: Step (a) non-metallocene precatalyst+support material→supported non-metallocene precatalyst. Step (b) supported non-metallocene precatalyst+an amount of activator→intermediate mixture of activated and supported non-metallocene catalyst+leftover activator disposed on (or in equilibrium with) the support material. Step (c) intermediate mixture+effective amount of productivity-increasing organic compound→productivity enhanced non-metallocene catalyst disposed on (or in equilibrium with) support material. In some aspects step (a) further includes an inert hydrocarbon solvent and deposition on the support material is performed by evaporating the solvent, alternatively by spray-drying. The amount of activator may be a stoichiometric amount relative to the metal M of the non-metallocene catalyst (e.g., a molar ratio of 1.0 to 1.0); alternatively a less than stoichiometric amount relative thereto (e.g., a molar ratio of from 0.1 to 0.94); alternatively an excess amount (e.g., a molar ratio from 1.1 to 10,000) relative thereto. Examples of the support material are alumina and hydrophobized fumed silica; alternatively the hydrophobized fumed silica. The hydrophobized fumed silica may be made by surface-treating an untreated, anhydrous fumed silica with an effective amount of a hydrophobing agent. The hydrophobing agent may be dimethyldichlorosilane, a polydimethylsiloxane fluid, or hexamethyldisilazane; alternatively dimethyldichlorosilane. The hydrophobized fumed silica made by surface-treating an untreated, anhydrous fumed silica with dimethyldichlorosilane may be CABOSIL TS-610, which is a fumed silica that is surface treated with dimethyldichlorosilane.

Synthesis Scheme 7: Step (a) non-metallocene precatalyst+effective amount of productivity-increasing organic compound+support material→intermediate mixture of non-metallocene precatalyst and productivity-increasing organic compound disposed on (or in equilibrium with) support material. Step (b) intermediate mixture+activator (e.g., an alkylaluminoxane such as methylaluminoxane ("MAO"))→productivity enhanced non-metallocene catalyst disposed on (or in equilibrium with) support material. In some aspects step (a) further includes an inert hydrocarbon solvent and deposition on the support material is performed by evaporating the solvent, alternatively by spray-drying.

Synthesis Scheme 8: Step (a) non-metallocene precatalyst+support material+activator (e.g., an alkylaluminoxane such as methylaluminoxane ("MAO"))→activated and supported non-metallocene catalyst disposed on (or in equilibrium with) support material. Step (b) supported activated non-metallocene catalyst+effective amount of productivity-increasing organic compound→productivity enhanced non-metallocene catalyst disposed on (or in equilibrium with) support material. In some aspects step (a) further includes an inert hydrocarbon solvent and deposition on the support material is performed by evaporating the solvent, alternatively by spray-drying.

Synthesis Scheme 9: Step (a) activator (e.g., an alkylaluminoxane such as methylaluminoxane ("MAO"))+effective amount of productivity-increasing organic compound→intermediate solution. Step (b) Intermediate solution+non-metallocene precatalyst+support material→productivity enhanced non-metallocene catalyst disposed on (or in equilibrium with) support material. In some aspects step (b) further includes an inert hydrocarbon solvent and deposition on the support material is performed by evaporating the solvent, alternatively by spray-drying.

Synthesis Scheme 10: Step (a) activator→non-metallocene precatalyst+support material←effective amount of productivity-increasing organic compound (simultaneous but separate additions of activator and productivity-increasing organic compound to mixture of non-metallocene precatalyst+support material)→productivity enhanced non-metallocene catalyst disposed on (or in equilibrium with) support material. Step (b): none. In some aspects step (a) further includes an inert hydrocarbon solvent and deposition on the support material is performed by evaporating the solvent, alternatively by spray-drying.

Scheme 11: Step (a): activator (e.g., an alkylaluminoxane such as methylaluminoxane ("MAO"))+support material (e.g., hydrophobic fumed silica)+inert hydrocarbon solvent→slurry of supported activator disposed on (or in equilibrium with) support material. Step (b): spray-dry slurry of step (a)→spray-dried supported activator disposed on support material in form of a dry powder (e.g., spray-dried MAO on hydrophobic fumed silica as dry powder ("SD-MAO" or "sdMAO"). Step (c): mix non-metallocene precatalyst+spray-dried supported activator of step (b)+inert hydrocarbon solvent→suspension of supported non-metallocene catalyst disposed on (or in equilibrium with) the support material. Step (d): mix suspension from step (c) with effective amount of a productivity-increasing organic compound→suspension of a supported productivity enhanced non-metallocene catalyst disposed on (or in equilibrium with) the support material in inert hydrocarbon solvent. Optional step (e): remove inert hydrocarbon solvent from the suspension of supported productivity enhanced non-metallocene catalyst→supported productivity enhanced non-metallocene catalyst disposed on support material in the form of a dry powder. Step (e) may be performed by conventional evaporating of the inert hydrocarbon solvent from the suspension from step (d) or by spray-drying the suspension from step (d).

Scheme 12: making a multimodal catalyst system comprising the productivity enhanced non-metallocene catalyst and a different catalyst (e.g., a metallocene catalyst) spray-dried on a silica support: Step (a) non-metallocene precatalyst+support material+activator (e.g., an alkylaluminoxane such as methylaluminoxane ("MAO"))→activated non-metallocene catalyst disposed on (or in equilibrium with) support material. Step (b) supported activated non-metallocene catalyst+effective amount of productivity-increasing organic compound→productivity enhanced non-metallocene catalyst disposed on (or in equilibrium with) support material (e.g., a spray-dried support material). Step (c) adding a different catalyst and/or precatalyst that is added with activator or subsequently contacted with activator to form a different catalyst to the productivity enhanced non-metallocene catalyst disposed on (or in equilibrium with) the support material to give the multimodal catalyst system. In some aspects step (a) further includes an inert hydrocarbon solvent and deposition on the support material is performed by evaporating the solvent, alternatively by spray-drying. For example, slurry support material (e.g., fumed silica) and MAO in a solvent (e.g., toluene). Then add non-metallocene precatalyst. Mix for a period of time (e.g., 1 hour). Then add productivity-increasing organic compound. Mix for another period of time (e.g., 1 hour). Then add a second different precatalyst (e.g., a metallocene precatalyst). Spray dry resulting mixture.

The multimodal catalyst system may be made fed into the gas-phase polymerization reactor. If desired an additional quantity of the productivity enhanced non-metallocene catalyst or an additional quantity of the second precatalyst (e.g., a metallocene precatalyst) may be separately fed into the reactor as a solution thereof in an inert hydrocarbon solvent, wherein it contacts the multimodal catalyst system. Such a separate catalyst and/or precatalyst solution is sometimes called a trim catalyst. Alternatively, the multimodal catalyst system may be contacted with a feed of the trim catalyst in a feed line heading into the reactor. In other embodiments the multimodal catalyst system such as a trimodal catalyst system may be made in situ in a gas-phase polymerization reactor by adding the productivity enhanced non-metallocene catalyst and at least one second catalyst and/or precatalyst separately into the reactor, wherein they contact each other, thereby making the multimodal catalyst system in situ in the reactor.

The method of any one of the above aspects may further comprise a step of transferring polymer granules, made in the gas-phase, solution-phase, or slurry-phase polymerization reactor and containing in the granules fully-active productivity enhanced non-metallocene catalyst, into a (second) gas-phase polymerization reactor.

Productivity-increasing organic compound. The productivity-increasing organic compound may be of formula (A), as detailed herein. As detailed herein, the productivity-increasing organic compound of formula (A) surprisingly and beneficially improves productivity, and does not function as a poison to the non-metallocene catalyst (or may at most function mildly as such) as may have been perceived be a skilled person viewing the organic compound of formula (A) in the absence of Applicant's surprising discovery herein. The compound of formula (A) is an alkyne. The productivity-increasing organic compound is free of a vinyl functional group (i.e., lacks a group of formula $-C(H)=CH_2$). In some embodiments of the productivity-increasing organic compound of formula (A), (formula A)

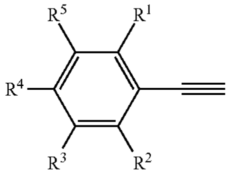

wherein each of $R^5$, $R^4$ and $R^3$ independently is H, a halogen, or a $(C_1\text{-}C_{20})$hydrocarbyl; with the proviso that at least one of $R^5$ and $R^3$ is a halogen or a haloalkyl; wherein each of $R^2$ and $R^1$ independently is H, a halogen, or a $(C_1\text{-}C_{20})$hydrocarbyl, wherein each $(C_1\text{-}C_{20})$hydrocarbyl independently is unsubstituted or substituted with from 1 to 4 substituent groups $R^S$; wherein each substituent group $R^S$ is independently selected from halogen, unsubstituted $(C_1\text{-}C_5)$alkyl, —C≡CH, —OH, $(C_1\text{-}C_5)$alkoxy, —C(═O)-(unsubstituted $(C_1\text{-}C_5)$alkyl), —$NH_2$, —N(H)(unsubstituted $(C_1\text{-}C_5)$alkyl), —N(unsubstituted $(C_1\text{-}C_5)$alkyl$)_2$, —COOH, —C(═O)—$NH_2$, —C(═O)—N(H)(unsubstituted $(C_1\text{-}C_5)$alkyl), —C(═O)—N(unsubstituted $(C_1\text{-}C_5)$alkyl$)_2$, —S-(unsubstituted $(C_1\text{-}C_5)$alkyl), —S(═O$)_2$-(unsubstituted $(C_1\text{-}C_5)$alkyl), —S(═O$)_2$—$NH_2$, —S(═O$)_2$—N(H)(unsubstituted $(C_1\text{-}C_5)$alkyl), —S(═O$)_2$—N(unsubstituted $(C_1\text{-}C_5)$alkyl$)_2$, —C(═O)S-(unsubstituted $(C_1\text{-}C_5)$alkyl) and —COO(unsubstituted $(C_1\text{-}C_5)$alkyl).

Productivity enhanced non-metallocene catalyst. As mentioned, first non-metallocene precatalyst can be chemically converted to make the productivity enhanced non-metallocene catalyst. Without being bound by theory it is believed that the structure of the productivity enhanced non-metallocene catalyst is similar to the structure of the first non-metallocene precatalyst and/or a first non-metallocene catalyst (made from the first non-metallocene precatalyst), for instance, wherein one of the leaving groups X of the first non-metallocene precatalyst has been replaced by a leaving group R in the productivity enhanced non-metallocene catalyst wherein R is defined later and is derived from the productivity-increasing organic compound. Leaving group R of the productivity enhanced non-metallocene catalyst is structurally different than the leaving group X of the first non-metallocene precatalyst. In some embodiments at least one X is $((C_1\text{-}C_{20})alkyl)_{3\text{-}g}\text{-}(phenyl)_gSi$— wherein subscript g is 0, 1, 2, or 3; alternatively, wherein subscript g is 0 or 1; alternatively 0; alternatively 1. In some aspects at least one X is a $(C_6\text{-}C_{12})$aryl-$((C_0\text{-}C_{10})$alkylene)-$CH_2$ (e.g., benzyl). In some aspects each X is independently a $(C_6\text{-}C_{12})$aryl-$((C_0\text{-}C_{10})$alkylene)-$CH_2$, alternatively one X is a $(C_6\text{-}C_{12})$aryl-$((C_0\text{-}C_{10})$alkylene)-$CH_2$ (e.g., benzyl) and the other X is F, Cl, or methyl; alternatively each X is benzyl. In some aspects each X is benzyl, alternatively one X is a benzyl and the other X is F, Cl, or methyl. In some embodiments at least one X, alternatively each X is a $(C_1\text{-}C_6)$alkoxy-substituted $(C_6\text{-}C_{12})$aryl or a $(C_1\text{-}C_6)$alkoxy-substituted benzyl.

The ligand in the productivity enhanced non-metallocene catalyst that is derived from the productivity-increasing organic compound may be the group R ("ligand R"). The ligand R may be of formula (A): —C($R^{14}$)═C(X)$R^{15}$; wherein each of $R^{14}$ and $R^{15}$ of the ligand of formula (A): —C($R^5$)═C(X)$R^6$ independently is H or $R^{16}$, and wherein each $R^{16}$ of the ligand of formula (A): —C($R^5$)═C(X)$R^6$ independently is a $(C_1\text{-}C_{20})$hydrocarbyl, a $(C_1\text{-}C_{20})$heterohydrocarbyl, a $(C_1\text{-}C_{20})$aryl, or a $(C_1\text{-}C_{20})$heteroaryl with the proviso that each $R^{16}$ lacks a non-conjugated carbon-carbon double bond. The $(C_1\text{-}C_{20})$hydrocarbyl may be unsubstituted and consist of carbon atoms and hydrogen atoms or the $(C_1\text{-}C_{20})$hydrocarbyl may be substituted and consist of carbon, hydrogen, and one or more halogen atoms. Each halogen atom is independently selected from F, Cl, Br, and I; alternatively from F, Cl, and Br; alternatively from F and Cl; alternatively from F; alternatively from $C_1$. The unsubstituted $(C_1\text{-}C_{20})$hydrocarbyl may be an unsubstituted $(C_1\text{-}C_{20})$alkyl, an unsubstituted $(C_3\text{-}C_{20})$cycloalkyl, an unsubstituted $(C_6\text{-}C_{12})$aryl, an unsubstituted $((C_1\text{-}C_4)\text{-}alkyl)_{1\text{-}3}$-phenyl, or an unsubstituted $(C_6\text{-}C_{12})$aryl-$(C_1\text{-}C_6)$alkyl. The substituted $(C_1\text{-}C_{20})$hydrocarbyl may be a monofluoro or difluoro derivative of the aforementioned unsubstituted $(C_1\text{-}C_{20})$hydrocarbyl, such as 2-(3,4-difluorophenyl)-ethen-1-yl (of formula (A)).

Each $(C_1\text{-}C_{19})$heterohydrocarbyl, of embodiments of $R^{14}$ to $R^{16}$ containing the same, may be unsubstituted and consist of carbon atoms, hydrogen atoms, and at least one heteroatom selected from N and O or the $(C_1\text{-}C_{17})$heterohydrocarbyl may be substituted and consist of carbon atoms, hydrogen atoms, at least one heteroatom selected from N and O, and one or more halogen atoms. The unsubstituted $(C_1\text{-}C_{17})$heterohydrocarbyl may be $(C_1\text{-}C_{19})$heteroalkyl, $(C_3\text{-}C_{19})$heterocycloalkyl, $(C_6\text{-}C_{12})$heteroaryl, $((C_1\text{-}C_4)alkoxy)_{1\text{-}3}$-phenyl, or $(C_6\text{-}C_{12})$heteroaryl-$(C_1\text{-}C_6)$alkyl. The substituted $(C_1\text{-}C_{17})$heterohydrocarbyl may be a monofluoro or difluoro derivative of the aforementioned unsubstituted $(C_1\text{-}C_{17})$heterohydrocarbyl, such as 2-(3,4-dimethoxyphenyl)-ethen-1-yl (of formula (A)).

The structure of ligand R is different than that of ligand X of the non-metallocene precatalyst and, for that matter, that of anion $A^-$ of a non-metallocene catalyst formed from the non-metallocene precatalyst.

Effective amount of the productivity-increasing organic compound (PIC). A quantity of productivity-increasing organic compound (PIC) is sufficient to make a productivity enhanced non-metallocene catalyst. The effective amount of PIC may be expressed in absolute terms compared to the amount of (pre)catalyst metal M or in relative terms compared to the productivity performance or as a combination thereof.

In absolute terms in some embodiments the effective amount of the productivity-increasing organic compound may be expressed as a molar ratio of moles of productivity-increasing organic compound to moles of metal M ("$MIC_{mol}/M_{mol}$"), wherein M is the M of the non-metallocene precatalyst of structural formula (I), e.g., M is a Group 4 metal. In some embodiments the effective amount of the PIC is expressed as a $PIC_{mol}/M_{mol}$ of ≥0.50/1.0, alternatively ≥0.9/1.0; alternatively ≥1.0/1.0; alternatively ≥1.5/1.0; alternatively ≥1.9/1.0; alternatively ≥3/1.0; alternatively ≥5/1.0; alternatively ≥6/1.0; alternatively ≥9/1.0; alternatively ≥10.0/1.0, alternatively ≤10.0/1.0, alternatively ≤20.0/1.0, alternatively ≤30.0/1.0, alternatively ≤40.0/1.0, alternatively ≤50.0/1.0. Said another way, the immediately foregoing embodiments may be described by expressing the effective amount of the PIC as an inverse molar ratio of moles of metal M to moles of productivity-increasing organic compound ("$M_{mol}/PIC_{mol}$") as follows: ≤1.0/0.5; alternatively ≤1.0/0.9; alternatively ≤1.0/1.0; alternatively ≤1.0/1.5; alternatively ≤1.0/1.9; alternatively ≤1.0/3.0; alternatively ≤1.0/5.0; alternatively ≤1.0/6.0; alternatively ≤1.0/9.0; alternatively ≤1.0/10.0, alternatively ≤1.0/20.0, alternatively ≤1.0/30.0, alternatively ≤1.0/40.0, alternatively ≤1.0/50.0, respectively. In some embodiments the $MIC_{mol}/M_{mol}$ is limited to at most 40/1; alternatively at most 30/1; alternatively at most 20/1; alternatively at most 10.0; alternatively at most 6.0; alternatively at most 5.0.

In relative terms of productivity performance; the effective amount of the productivity-increasing organic compound (PIC) may provide a productivity enhanced non-metallocene catalyst having improved productivity. In some embodiments the productivity enhanced non-metallocene catalyst and the effective amount of the MIC is characterized by having improved productivity. In some embodiments the productivity enhanced non-metallocene catalyst is that made from any one of the non-metallocene precatalyst of formula (I) such as compounds (1), described herein.

Comparative or non-inventive examples either do not contain productivity-increasing organic compound or contain less than the effective amount of the productivity-increasing organic compound.

Catalyst activity. Catalyst activity of the productivity enhanced non-metallocene catalyst is determined to be the catalyst's activity/polymerization productivity, expressed as number of grams dried polyolefin product made per gram of catalyst added (gPE/gcat), and all other things being equal may not be significantly less than, and in some embodiments may be more than, that of the non-metallocene precatalyst.

Catalyst structures. Without being bound by theory it is believed that the molecular structure of a non-metallocene catalyst (formed from the non-metallocene precatalyst of formula I) and the molecular structure of the productivity enhanced non-metallocene catalyst may be determined by conventional analytical methods such as nuclear magnetic resonance (NMR) spectroscopy or gas chromatography/mass spectrometry (GC/MS).

Activating step. In some embodiments the method of making productivity enhanced non-metallocene catalyst further comprises the activating step as a preliminary step, which may be completed before start of the combining step. The activating step comprises contacting the non-metallocene precatalyst of formula (I) with the activator under the effective activating conditions that make the non-metallocene catalyst or the productivity enhanced non-metallocene catalyst. The activating step may be performed in the absence of the productivity-increasing organic compound.

Activator. The activator for activating the non-metallocene precatalyst of formula (I) may be an alkylaluminoxane, an organoborane compound, an organoborate compound, or a trialkylaluminum compound. The activator may also be a combination of any two or more thereof. For example the activator may comprise an alkylaluminoxane and an organoborate compound such as a methylaluminoxane and an organoborate having CAS name Amines, bis(hydrogenated tallow alkyl)methyl, tetrakis(pentafluorophenyl)borate (Amines, bis(hydrogenated tallow alkyl)methyl, tetrakis(pentafluorophenyl)borate(1-)).

Alkylaluminoxane: also referred to as alkylalumoxane. A product of a partial hydrolysis of a trialkylaluminum compound. Embodiments may be a $(C_1-C_{10})$alkylaluminoxane, alternatively a $(C_1-C_6)$alkylaluminoxane, alternatively a $(C_1-C_4)$alkylaluminoxane, alternatively a $(C_1-C_3)$alkylaluminoxane, alternatively a $(C_1-C_2)$alkylaluminoxane, alternatively a methylaluminoxane (MAO), alternatively a modified-methylaluminoxane (MMAO). In some aspects the alkylaluminoxane is a MAO. In some embodiments the alkylaluminoxane is supported on untreated silica, such as fumed silica. The alkylaluminoxane may be obtained from a commercial supplier or prepared by any suitable method. Suitable methods for preparing alkylaluminoxanes are well-known. Examples of such preparation methods are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; and 5,693,838; and in European publications EP-A-0 561 476; EP-B1-0 279 586; and EP-A-0 594-218; and in PCT publication WO 94/10180.

The maximum amount of alkylalumoxane may be selected to be a 5,000-fold molar excess over the precatalyst based on the molar ratio of moles of Al metal atoms in the aluminoxane to moles of metal atoms M (e.g., Ti, Zr, or Hf) in the precatalyst. The minimum amount of activator-to-precatalyst may be a 1:1 molar ratio (Al/M). The maximum may be a molar ratio of Al/M of 150, alternatively 124.

The organoborane compound. A tri(fluoro-functional organo)borane compound ((fluoro-organo)$_3$B) such as tris(pentafluorophenyl)borane ($(C_6F_5)_3B$), tris[3,5-bis(trifluoromethyl)phenyl]borane ($(3,5-(CF_3)_2—C_6H_3)_3B$), or a mixture of any two or more thereof.

The organoborate compound. A tetra(fluoro-functional organo)borate compound((fluoro-organo)$_4$B) such as N,N-dimethylanilinium tetrakis(pentafluorophenyl)borate, triphenylcarbenium tetrakis(pentafluorophenyl)borate, N,N-dimethylanilinium tetrakis[3,5-bis(trifluoromethyl)phenyl]borate, or triphenylcarbenium tetrakis[3,5-bis(trifluoromethyl)phenyl]borate, or a mixture of any two or more thereof. The organoborate compound may be a methyldi(($C_{14}$-$C_{18}$)alkyl)ammonium salt of tetrakis(pentafluorophenyl)borate, which may be obtained from Boulder Scientific or prepared by reaction of a long chain trialkylamine (Armeen™ M2HT, available from Akzo-Nobel, Inc.) with HCl and $Li[B(C_6F_5)_4]$. Such a preparation is disclosed in U.S. Pat. No. 5,919,983, Ex. 2. The organoborate compound may be used herein without (further) purification. Also, examples include amines, bis(hydrogenated tallow alkyl) methyl, and tetrakis(pentafluorophenyl)borate.

Trialkylaluminum compounds may be utilized as activators for precatalyst or as scavengers to remove residual water from polymerization reactor prior to start-up thereof. Examples of suitable alkylaluminum compounds are trimethylaluminum, triethylaluminum, triisobutylaluminum, tri-n-hexylaluminum, and tri-n-octylaluminum.

The activator, also known as a cocatalyst, may affect the molecular weight, degree of branching, comonomer content, or other properties of the polyolefin polymer. The activator may enable coordination polymerization or cationic polymerization.

Without being bound by theory it is believed that the choice of activator used to activate the non-metallocene precatalyst does not influence the structure of the productivity enhanced non-metallocene catalyst made from the non-metallocene precatalyst. That is, the structures of the productivity enhanced non-metallocene catalyst made using different activators are expected to be identical.

Effective conditions. The reactions described herein (e.g., the combining step, the activating step, the polymerization) independently are conducted under circumstances that allow the reaction to proceed. Examples of effective conditions are reaction temperature, type of atmosphere (e.g., inert atmosphere), purity of reactants, stoichiometry of reactants, agitation/mixing of reactants, and reaction time period. Conditions effective for activating and polymerizing steps may be those described in the art and well-known to the ordinary skilled person. For example, activating effective conditions may comprise techniques for manipulating catalysts such as in-line mixers, catalyst preparation reactors, and polymerization reactors. The activation temperature may be from 20° to 800° C., alternatively from 300° to 650° C. The activation time may be from 10 seconds to 2 hours. Examples of gas-phase polymerizing conditions are described later herein. Effective conditions for the combining step used to make the productivity enhanced non-metallocene catalyst may comprise a reaction temperature from −50° to 80° C., alternatively from 0° to 50° C., alternatively from −50° to 50° C., alternatively from −50° to 30° C., an inert atmosphere (e.g., nitrogen, helium, or argon gas free of water and $O_2$), reactants that are free of water and $O_2$ and having a purity from 90% to 100%, amounts of reactants for minimizing waste/maximizing product yield, stirring or mixing reactants, and a reaction time period from 1 minute to 24 hours.

Effective reaction conditions for making the productivity enhanced non-metallocene catalyst. Such conditions may comprise techniques for manipulating air-sensitive and/or moisture-sensitive reagents and reactants such as Schlenk-line techniques and an inert gas atmosphere (e.g., nitrogen, helium, or argon). Effective reaction conditions may also comprise a sufficient reaction time, a sufficient reaction temperature, and a sufficient reaction pressure. Each reaction temperature independently may be from −78° to 120° C., alternatively from −30° to 30° C. Each reaction pressure independently may be from 95 to 105 kPa, alternatively from 99 to 103 kPa. Progress of any particular reaction step may be monitored by analytical methods such as nuclear magnetic resonance (NMR) spectroscopy, mass spectrometry to determine a reaction time that is effective for maximizing yield of intended product. Alternatively, each reaction time independently may be from 30 minutes to 48 hours.

The non-metallocene precatalyst (e.g., the non-metallocene precatalyst of formula (I)). The non-metallocene precatalyst may be synthesized according to methods known in the art, including those methods referenced herein. Alternatively, the non-metallocene precatalyst may be obtained from a precatalyst supplier such as Boulder Scientific. In some aspects the productivity enhanced non-metallocene catalyst is a product of an activation reaction of an activator and any one of the aforementioned non-metallocene precatalyst.

Polyolefin polymer made by the method of polymerizing. When the 1-alkene monomer is the combination of ethylene and propylene, the polyolefin polymer made therefrom is an ethylene/propylene copolymer. When the 1-alkene monomer is ethylene alone, the polyolefin polymer made therefrom is a polyethylene homopolymer. When the 1-alkene monomer is the combination of ethylene and 1-butene, 1-hexene, or 1-octene, the polyolefin polymer made therefrom is a poly(ethylene-co-1-butene) copolymer, a poly(ethylene-co-1-hexene) copolymer, or a poly(ethylene-co-1-octene) copolymer. In some embodiments the polyolefin polymer made from the 1-alkene monomer is an ethylene-based polymer having from 50 to 100 weight percent (wt %) repeat units derived from ethylene and from 50 to 0 wt % repeat units derived from a 1-alkene monomer selected from propylene, 1-butene, 1-hexene, 1-octene, and the combination of any two or more thereof.

In some embodiments the polymerization method uses the 1-alkene monomer and a comonomer that is a diene monomer (e.g., 1,3-butadiene). When the 1-alkene monomer is a combination of ethylene and propylene and the polymerization also uses a diene monomer, the polyolefin polymer is an ethylene/propylene/diene monomer (EPDM) copolymer. The EPDM copolymer may be an ethylene/propylene/1,3-butadiene copolymer.

The multimodal (e.g., bimodal or trimodal) catalyst system. The multimodal catalyst system comprises the productivity enhanced non-metallocene catalyst and at least one different olefin polymerization catalyst selected from a metallocene catalyst and a different non-metallocene catalyst. The multimodal catalyst system makes in a single reactor a multimodal polyethylene composition comprising an HMW polyethylene component and an LMW polyethylene component.

The method of making the productivity enhanced non-metallocene catalyst may be performed in the presence of the different olefin catalyst (e.g., a metallocene catalyst or a metallocene precatalyst). However, when performed in the presence of a different precatalyst, the method of activating the non-metallocene precatalyst with an activator further comprises activating the different (e.g., metallocene) precatalyst with a same or different activator. Typically, the method of making the productivity enhanced non-metallocene catalyst is performed in the absence of a different precatalyst.

Unsupported or supported catalyst. The non-metallocene precatalyst, the non-metallocene catalyst (made from the non-metallocene precatalyst), the productivity enhanced non-metallocene catalyst, and the multimodal catalyst system independently may be unsupported or disposed on a solid particulate support material. When the support material is absent, the non-metallocene precatalyst, the non-metallocene catalyst, the productivity enhanced non-metallocene catalyst, and the multimodal catalyst system may be injected into a slurry-phase, solution-phase, or gas-phase polymerization reactor as a solution in a hydrocarbon solvent. When the non-metallocene precatalyst, the non-metallocene catalyst, the productivity enhanced non-metallocene catalyst, and the multimodal catalyst system is/are disposed on the support material, they may be injected into the slurry-phase, solution-phase, or gas-phase polymerization reactor as a slurry suspended in the hydrocarbon solvent or as a dry, powder (i.e., dry particulate solid).

The non-metallocene precatalyst, the non-metallocene catalyst (made from the non-metallocene precatalyst), the productivity enhanced non-metallocene catalyst, and/or the multimodal catalyst system may be premade in the absence of the support material and later disposed onto the support material. Alternatively, the non-metallocene precatalyst or the non-metallocene catalyst may be disposed onto the support material, and then the non-metallocene catalyst and/or the productivity enhanced non-metallocene catalyst may be made in situ on the support material.

The non-metallocene precatalyst, the non-metallocene catalyst, the productivity enhanced non-metallocene catalyst, and/or the multimodal catalyst system may be made by a concentrating method by evaporating a hydrocarbon solvent from a suspension or solution of the support material in a solution of the non-metallocene precatalyst, the non-metallocene catalyst, the productivity enhanced non-metallocene catalyst, and/or the multimodal catalyst system in the hydrocarbon solvent. Alternatively, the non-metallocene precatalyst, the non-metallocene catalyst, the productivity enhanced non-metallocene catalyst, and/or the multimodal catalyst system may be made by a spray-drying method by spray-drying the suspension or solution. In some embodiments the spray-drying method is used.

The support material. The support material is a particulate solid that may be nonporous, semi-porous, or porous. A carrier material is a porous support material. Examples of support materials are talc, inorganic oxides, inorganic chloride, zeolites, clays, resins, and mixtures of any two or more thereof. Examples of suitable resins are polystyrene, functionalized or crosslinked organic supports, such as polystyrene divinyl benzene polyolefins. The support material independently may be an untreated silica, alternatively a calcined untreated silica, alternatively a hydrophobing agent-treated silica, alternatively a calcined and hydrophobing agent-treated silica. The hydrophobing agent may be dichlorodimethylsilane.

Inorganic oxide support materials include Group 2, 3, 4, 5, 13 or 14 metal oxides. The preferred supports include silica, which may or may not be dehydrated, fumed silica, alumina (see, for example, PCT Publication WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in PCT Publication WO 99/47598; aerogels as disclosed in PCT Publication WO 99/48605; spherulites as disclosed in U.S. Pat. No. 5,972,510; and polymeric beads as disclosed in PCT Publication WO 99/50311.

The support material may have a surface area in the range of from about 10 $m^2/g$ to about 700 $m^2/g$, a pore volume in the range of from about 0.1 $cm^3/g$ to about 4.0 $cm^3/g$, and average particle size in the range of from about 5 microns to about 500 microns. The support material may be a silica (e.g., fumed silica), alumina, a clay, or talc. The fumed silica may be hydrophilic (untreated), alternatively hydrophobic (treated). In some aspects the support is a hydrophobic fumed silica, which may be prepared by treating an untreated fumed silica with a hydrophobing agent such as dimethyldichlorosilane, a polydimethylsiloxane fluid, or hexamethyldisilazane. In some aspects the treating agent is dimethyldichlorosilane. In one embodiment, the support is Cabosil™ TS-610.

One or more precatalysts and/or one or more activators may be deposited on, contacted with, vaporized with, bonded to, or incorporated within, adsorbed or absorbed in, or on, one or more support or carrier materials.

The non-metallocene precatalyst may be spray dried according to the general methods described in U.S. Pat. No. 5,648,310. The support used with the productivity enhanced non-metallocene catalyst may be functionalized, as generally described in EP 0 802 203, or at least one substituent or leaving group is selected as described in U.S. Pat. No. 5,688,880.

Solution phase polymerization and/or slurry phase polymerization of olefin monomer(s) are well-known. See for example U.S. Pat. No. 8,291,115B2.

Inert hydrocarbon solvent. An alkane, an arene, or an alkylarene (i.e., arylalkane). Examples of inert hydrocarbon solvents are alkanes such as mineral oil, pentanes, hexanes, heptanes, octanes, nonanes, decanes, undecanes, dodecanes, etc., and toluene, and xylenes. In one embodiment, the inert hydrocarbon solvent is an alkane, or a mixture of alkanes, wherein each alkane independently has from 5 to 20 carbon atoms, alternatively from 5 to 12 carbon atoms, alternatively from 5 to 10 carbon atoms. Each alkane independently may be acyclic or cyclic. Each acyclic alkane independently may be straight chain or branched chain. The acyclic alkane may be pentane, 1-methylbutane (isopentane), hexane, 1-methylpentane (isohexane), heptane, 1-methylhexane (isoheptane), octane, nonane, decane, or a mixture of any two or more thereof. The cyclic alkane may be cyclopentane, cyclohexane, cycloheptane, cyclooctane, cyclononane, cyclodecane, methycyclopentane, methylcyclohexane, dimethylcyclopentane, or a mixture of any two or more thereof. Additional examples of suitable alkanes include Isopar-C, Isopar-E, and mineral oil such as white mineral oil. In some aspects the inert hydrocarbon solvent is free of mineral oil. The inert hydrocarbon solvent may consist of one or more $(C_5-C_{12})$alkanes.

Gas-phase polymerization (GPP). The polymerization uses a GPP reactor, such as a stirred-bed gas phase polymerization reactor (SB-GPP reactor) or a fluidized-bed gas-phase polymerization reactor (FB-GPP reactor). Such reactors and methods are generally well-known. For example, the FB-GPP reactor/method may be as described in any one of U.S. Pat. Nos. 3,709,853; 4,003,712; 4,011,382; 4,302,566; 4,543,399; 4,882,400; 5,352,749; 5,541,270; US 2018/0079836 A1; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other useful reactors/processes contemplated include series or multistage polymerization processes such as described in U.S. Pat. Nos. 5,627,242; 5,665,818; 5,677,375; EP A-0 794 200; EP-B1-0 649 992; EP-A-0 802 202; and EP-B-634421

Gas phase polymerization operating conditions are any variable or combination of variables that may affect a polymerization reaction in the GPP reactor or a composition or property of a polyolefin polymer composition product made thereby. The variables may include reactor design and size; precatalyst composition and amount; reactant composition and amount; molar ratio of two different reactants; presence or absence of feed gases such as $H_2$, molar ratio of feed gases versus reactants, absence or concentration of interfering materials (e.g., $H_2O$ and/or $O_2$), absence or presence of an induced condensing agent (ICA), average polymer residence time in the reactor, partial pressures of constituents, feed rates of monomers, reactor bed temperature (e.g., fluidized bed temperature), nature or sequence of process steps, time periods for transitioning between steps. Variables other than that/those being described or changed by the method or use may be kept constant.

In a GPP method, control individual flow rates of ethylene ("$C_2$"), hydrogen ("$H_2$") and 1-hexene ("$C_6$" or "$C_x$" wherein x is 6) to maintain a fixed comonomer to ethylene monomer gas molar ratio or feed mass ratio ($C_x/C_2$, e.g., $C_6/C_2$) equal to a described value (e.g., 0.004 or 0.0016), a constant hydrogen to ethylene gas molar ratio or feed mass ratio ("$H_2/C_2$") equal to a described value (e.g., 0.0011 or 0.0068), and a constant ethylene ("$C_2$") partial pressure equal to a described value (e.g., 1,000 kPa). Measure concentrations of gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.79 meter per second (m/sec) (1.6 to 2.6 feet per second (ft/sec)). Operate the FB-GPP reactor at a total pressure of about 2068 to about 2758 kilopascals (kPa) (about 300 to about 400 pounds per square inch-gauge (psig)) and at a described first reactor bed temperature RBT. Maintain the fluidized bed at a constant height by withdrawing a portion of the bed at a rate equal to the rate of production of particulate form of the polyolefin polymer composition, which production rate may be from 5,000 to 150,000 kilograms per hour (kg/hour). Remove the product polyolefin polymer composition semi-continuously via a series of valves into a fixed volume chamber, wherein this removed multimodal (e.g., bimodal or trimodal)ethylene-co-1-hexene copolymer composition is purged to remove entrained hydrocarbons and treated with a stream of humidified nitrogen ($N_2$) gas to deactivate any trace quantities of residual catalyst.

The catalyst system may be fed into the polymerization reactor(s) in "dry mode" or "wet mode", alternatively dry mode, alternatively wet mode. The dry mode is a dry powder or granules. The wet mode is a suspension in an inert liquid such as mineral oil.

Induced condensing agent (ICA). An inert liquid useful for cooling materials in GPP reactor(s). Its use is optional. The ICA may be a ($C_3$-$C_{20}$)alkane, alternatively a ($C_5$-$C_{20}$) alkane, e.g., 2-methylbutane (i.e., isopentane). See U.S. Pat. Nos. 4,453,399; 4,588,790; 4,994,534; 5,352,749; 5,462,999; and 6,489,408. ICA concentration in reactor may be from 0.1 to 25 mol %, alternatively from 1 to 16 mol %, alternatively from 1 to 10 mol %.

The GPP conditions may further include one or more additives such as a chain transfer agent or a promoter. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. GPP may be operated free of (not deliberately added) scavenging agents. The GPP reactor/method may further include an amount (e.g., 0.5 to 200 ppm based on all feeds into reactor) of one or more static control agents and/or one or more continuity additives such as aluminum stearate or polyethyleneimine. The static control agent(s) may be added to the FB-GPP reactor to inhibit formation or buildup of static charge therein.

The GPP reactor may be a commercial scale FB-GPP reactor such as a UNIPOL™ reactor or UNIPOL™ II reactor, which are available from Univation Technologies, LLC, a subsidiary of The Dow Chemical Company, Midland, Michigan, USA.

1-Alkene monomer. The 1-alkene monomer is a compound of formula $H_2C{=}C(H)(CH_2)_nR^8$, wherein subscript n is an integer from 0 to 19 and group $R^8$ is H or $CH_3$. Examples are ethylene (subscript n is 0 and $R^8$ is H), propylene (subscript n is 0 and $R^8$ is $CH_3$), and a ($C_4$-$C_{20}$) alpha-olefin (subscript n is an integer from 1 to 19 and $R^8$ is H or $CH_3$. In some embodiments the 1-alkene monomer is ethylene, propylene, 1-butene, 1-hexene, 1-octene, or a combination of any two or more thereof. In some embodiments the 1-alkene monomer is a combination of ethylene and propylene. In other embodiments the 1-alkene monomer is ethylene alone or a combination of ethylene and 1-butene, 1-hexene, or 1-octene.

Polyolefin polymer. A product of polymerizing at least one 1-alkene monomer with the productivity enhanced non-metallocene catalyst or the multimodal catalyst system. A macromolecule, or collection of macromolecules, having constitutional units derived from the at least one 1-alkene monomer. For example, when the at least one 1-alkene monomer consists of ethylene, the polyolefin polymer consists of a polyethylene homopolymer. When the at least one 1-alkene monomer consists of ethylene and propylene, the polyolefin polymer consists of an ethylene/propylene copolymer. When the at least one 1-alkene monomer consists of ethylene and a comonomer selected from 1-butene, 1-hexene, and 1-octene, the polyolefin polymer is selected from a poly(ethylene-co-1-butene) copolymer, a poly(ethylene-co-1-hexene) copolymer, and a poly(ethylene-co-1-octene) copolymer, respectively.

The polyolefin polymer may be a homopolymer or a copolymer. The polyolefin polymer made from the multimodal catalyst system has a multimodal (e.g., bimodal or trimodal) molecular weight distribution and comprises a higher molecular weight (HMW) polyolefin polymer component and a lower molecular weight (LMW) polyolefin polymer component. The HMW polyolefin polymer component and the LMW polyolefin polymer component may be made by the productivity enhanced non-metallocene catalyst.

Any compound, composition, formulation, material, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, material, mixture, or reaction product (e.g., Zr required by a zirconium compound, or C and H required by a polyethylene, or C, H, and O required by an alcohol) are not counted.

Alternatively precedes a distinct embodiment. ASTM is the standards organization, ASTM International, West Conshohocken, Pennsylvania, USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). Periodic Table of the Elements is the IUPAC version of May 1, 2018. May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. Room temperature: 23°±1° C.

Unless stated otherwise, definitions of terms used herein are taken from the IUPAC Compendium of Chemical Technology ("Gold Book") version 2.3.3 dated Feb. 24, 2014. Some definitions are given below for convenience.

As used herein, a "hydrocarbyl" or "hydrocarbyl group" includes aliphatic, cyclic, olefinic, acetylenic and aromatic radicals (i.e., hydrocarbon radicals) comprising hydrogen and carbon that are deficient by one hydrogen.

As used herein, an "alkyl" includes linear, branched and cyclic paraffin radicals that are deficient by one hydrogen. Thus, for example, a —CH3 group ("methyl") and a CH3CH2— group ("ethyl") are examples of alkyls.

As used herein, a "haloalkyl" includes any alkyl radical having one or more hydrogen atoms replaced by a halogen atom.

As used herein, "aryl" groups include phenyl, naphthyl, pyridyl and other radicals whose molecules have the ring structure characteristic of benzene, naphthylene, phenanthrene, anthracene, etc. It is understood that an "aryl' group can be a C6 to C20 aryl group. For example, a C6H5-aromatic structure is an "phenyl", a C6H4 2-aromatic structure is an "phenylene".

As used herein, an "alkylene" includes linear, branched and cyclic hydrocarbon radicals deficient by two hydrogens.

Thus, $—CH_2—$ ("methylene") and $—CH_2CH_2—$ ("ethylene") are examples of alkylene groups.

EXAMPLES

Additional inventive embodiments are the preceding aspects, and the claims described later, that describe a range for a process condition and/or a range for a material property, wherein in the additional inventive embodiments an endpoint of the process condition range and/or an endpoint of the material property range, respectively, is amended to any one exemplified process condition value and/or any one exemplified material property value, respectively, described below in this section for any one inventive example.

Absence of an exogenous organometallic compound means free of an external source of a metal atom-containing organic compound such as an external source of a catalyst that is different than the first non-metallocene precatalyst and free of a precatalyst that is different than the first precatalyst, i.e., free of means of making a second non-metallocene catalyst in situ in the combining step.

Additive The catalyst systems or polymerization processes may optionally have at least additive. The at least one additive may be a flowability aid for preventing agglomeration of dry catalyst particles; an anti-static compound for inhibiting build-up of electrical charges on polyolefin particles in floating-bed gas phase polymerization reactors; or an anti-fouling compound such as a metal carboxylate salt for inhibiting reactor fouling.

Bimodal means a molecular weight distribution having two, and only two peaks as determined by GPC, wherein the two peaks can be a head and shoulder configuration or a two heads configuration having a local minimum (valley) therebetween. It can also refer to a catalyst that produces such a bimodal molecular weight distribution.

Catalyst herein means a material is that can polymerize a monomer and optionally a comonomer so as to make a polymer. The catalyst may be an olefin polymerization catalyst, which can polymerize an olefin monomer (e.g., ethylene) and optionally an olefin comonomer (e.g., propylene and/or a $(C_4-C_{20})$alpha-olefin) so as to make a polyolefin homopolymer or, optionally, a polyolefin copolymer, respectively.

Catalyst system a set of at least two chemical constituents and/or reaction products thereof that together function as an integrated whole for enhancing rate of reaction, wherein at least one of the at least two chemical constituents is a catalyst. The other chemical constituent(s) may be independently selected from a different catalyst, a support material, excess amount of activator, a catalyst additive such as an anti-static agent, a co-catalyst, a carboxylate metal salt, a dispersant for preventing particles of the catalyst system from sticking together. The catalyst system may comprise a catalyst and a support material, wherein the catalyst is disposed on the support material, which hosts and provides a physical framework for increasing surface distribution of the catalyst. Catalyst system does not include a monomer, a comonomer, or the productivity-increasing organic compound.

Chemical conversion. The productivity enhanced non-metallocene catalyst is made by way of a chemical reaction. The chemical reaction takes place between the first non-metallocene precatalyst, the activator, and the productivity-increasing organic compound. That is, the productivity enhanced non-metallocene catalyst is made by chemically converting the first non-metallocene precatalyst into a productivity enhanced non-metallocene catalyst having an enhanced polymer producing functionality (e.g., having at least improved (greater) productivity). The productivity-increasing organic compound is free of a metal atom. Therefore, it is quite surprising that the productivity-increasing organic compound is capable of increasing the productivity of a catalyst made from the first non-metallocene precatalyst.

Consisting essentially of means free of an exogenous organometallic compound. The exogenous organometallic compound is compositionally different than the first non-metallocene precatalyst. Thus, the inventive method is not achieved by adding an exogenous organometallic compound or precatalyst precursor thereof. Thus, the contacting step of the method is performed in the absence of the exogenous organometallic compound or precatalyst precursor thereof. The first precatalyst is not self-modifying such that it cannot increase productivity of itself or another compound. Stated differently, in the absence of the productivity-increasing organic compound, there is no productivity increase.

Endogenous. Having an internal cause or origin, or preloaded.

Exogenous. Having an external cause or origin, or obtaining from an external source.

Feeding. Conveying or physically moving a material from outside of a space (e.g., outside a polymerization reactor) to the inside of the space (inside a polymerization reactor).

First non-metallocene catalyst. Made by activating a first non-metallocene precatalyst (first precatalyst) and a first activator. The first non-metallocene catalyst makes polymer at given rate, and thus if a higher rate is desired the first non-metallocene catalyst is in need of being chemically converted into a productivity enhanced non-metallocene catalyst. The inventive method can beneficially accomplish such a chemical conversion without using an exogenous organometallic compound to do the chemical conversion.

GPC means gel permeation chromatography.

Leaving group. A group bonded to the metal atom of a non-metallocene precatalyst and abstracted by an activator during the activation of the precatalyst to the non-metallocene catalyst. Examples of leaving groups are the monodentate group X in structural formula (I). Each non-metallocene precatalyst described herein implicitly has at least one leaving group, and typically two leaving groups.

Ligand. A monovalent, divalent, trivalent, or tetravalent and dicoordinate, tricoordinate or tetracoordinate organic group having two, three, or four, respectively coordinating functional groups for bonding to the metal atom of a non-metallocene precatalyst. The ligand remains coordinated to the metal atom in the non-metallocene catalyst made by activating the precatalyst. Thus, ligand indicates a group in a non-metallocene precatalyst that is carried over to the non-metallocene catalyst made by activating the precatalyst, whereas a leaving group indicates a labile group at least one of which is abstracted by the activator during the activating of the precatalyst.

Metal atom means a basic unit of any one of the following elements: of Groups 1 to 13, of rows 3 to 6 of Groups 14 to 16, of rows 5 and 6 of Group 17, of the lanthanides, and of the actinides, all of the Periodic Table of the Elements published by IUPAC on Dec. 1, 2018.

"Productivity-increasing or increase productivity means transforming a productivity of an olefin polymerization catalyst by increasing the productivity thereof as compared to a productivity of the olefin polymerization catalyst under the same polymerization conditions prior to chemically converting the olefin polymerization catalyst.

Productivity-increasing organic compound is a molecule consisting of carbon atoms, hydrogen atoms, optionally zero, one or more halogen atoms, and optionally zero, one or more heteroatoms independently selected from O, N, P, and Si; wherein the molecule is an alkynylarene that contains at least one halogen (e.g., fluorine atom) or a haloalkyl (e.g., trifluoromethyl) oriented meta to the alkynyl substituent and functions to increase productivity of an olefin polymerization catalyst. The productivity-increasing organic compound per se is free of a metal atom. The transformation beneficially may be accomplished in the absence of the exogenous organometallic compound and second precatalyst precursor thereof. The transformation beneficially may also be accomplished in the absence of a second activator.

Multimodal means a molecular weight distribution having two or more peaks as determined by GPC, wherein the two or more peaks independently can be a head and shoulder configuration or a two or more heads configuration having a local minimum (valley) therebetween. Examples of multimodal are bimodal and trimodal. It can also refer to a catalyst that produces such a multimodal molecular weight distribution.

Organic compound means a chemical entity consisting of, per molecule, carbon atoms, hydrogen atoms, optionally zero, one or more halogen atoms, and optionally zero, one, or more heteroatoms independently selected from O, N, P, and Si. The molecule does not have, i.e. is free of, a metal atom (i.e., the chemical entity does not include organometallic compounds).

Reaction conditions, including polymerization conditions, are environmental circumstances such as temperature, pressure, solvent, reactant concentrations, and the like under which a chemical transformation (e.g., polymerization) proceeds. All chemical transformations described herein are conducted under suitable and effective reaction conditions.

Short-chain branching distribution per 1000 carbon atoms or SCBD/1000C. A function of a change in weight percent (wt %) comonomeric content of the copolymer versus log(weight-average molecular weight ($M_W$)) of the copolymer, as measured by GPC. May be visually detected by plotting wt % comonomeric content on a y-axis versus log($M_W$) on an x-axis, and examining the slope of the plot in a range from log($M_W$) 4 to log($M_W$) 6 (i.e., the range from $M_W$ 10,000 to $M_W$ 1,000,000).

Support material means a finely-divided, particulate inorganic solid capable of hosting a catalyst.

Trimodal means a molecular weight distribution having three, and only three peaks as determined by GPC. It can also refer to a catalyst that produces such a trimodal molecular weight distribution.

Unsupported means free of an inorganic support material (e.g., silica).

Methods of chemically converting a non-metallocene precatalyst into a productivity enhanced non-metallocene catalyst are described herein. The productivity enhanced non-metallocene catalyst can be employed in a polymerization reactor to make polymers having improved productivity, as described herein.

Productivity-increasing organic compounds of formula (A), as detailed herein, are provided as follows. Productivity-increasing organic compounds (PIC1) is commercially available from Sigma-Aldrich. Productivity-increasing organic compounds (PIC2) is commercially available from Sigma-Aldrich. Productivity-increasing organic compounds (PIC3) is commercially available from Sigma-Aldrich. Productivity-increasing organic compounds (PIC4) is commercially available from Sigma-Aldrich. Additive 1 (AD1), Phenylacetylene (PhCCH), is commercially available from Sigma-Aldrich. Additive 2 (AD2), 1-ethynyl-2-flourobenzene (o-FPhCCH), is commercially available from Sigma-Aldrich. Additive 3 (AD3), 1-ethynyl-2-(trifluoromethyl) benzene (o-($CF_3$)PhCCH), is commercially available from Sigma-Aldrich.

Non-metallocene precatalyst of formula (1) is commercially available from Boulder Scientific. In various embodiments the non-metallocene precatalyst of formula (I) such as the non-metallocene precatalyst of compound (1) can be employed in a catalyst system in a polymerization reactor to form a high weight molecular weight polyethylene component in a multimodal polyethylene composition. Bn represents a benzyl group.

(Compound 1)

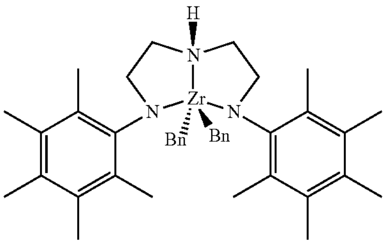

The productivity enhanced non-metallocene catalysts of Inventive examples 1-4 were prepared as follows. In a nitrogen-purged glove box an oven-dried glass bottle was charged with treated fumed silica (CABOSIL TS-610; available from W.R. Grace) as a support slurried in toluene (available from Aldrich), in the amounts indicated in Table 1, and stirred with a stir bar until well dispersed. As indicated in Table 1, an amount of a 10% solution by weight of methylaluminoxane (MAO)(available from W.R. Grace as 10 wt % in toluene) was added to the bottle to form a mixture. The mixture was stirred magnetically for 15 minutes, then the non-metallocene catalyst of formula (1) and the productivity-increasing organic compound, as detailed in Table 1, were added in the respective amounts described in Table 1 and the mixture was stirred for 30-60 minutes. The mixture was spray-dried using a Buchi Mini Spray Dryer B-290 with the following parameters to yield the dried and activated non-metallocene catalyst of Ex1: Set Temperature—185° C., Outlet Temperature—100° C. (min.), Aspirator—95 and Pump Speed—150 rpm.

The non-metallocene catalyst of Comparative Example 1 (CE1) was prepared the same as the productivity enhanced non-metallocene catalyst of IE1-4 with the change that the productivity-increasing organic compound was absent (not present in any amount).

The non-metallocene catalyst of Comparative Examples 2-4 (CE2-4) were prepared the same as the productivity enhanced non-metallocene catalysts of EX1-4 with the change that the productivity-increasing organic compound was absent (not present in any amount) and instead an amount of a different additive 1-3 (AD1-3) was present and the components were present in the amounts indicated in Table 1.

Gas-phase ethylene/1-hexene copolymerizations of the productivity enhanced non-metallocene catalysts of IE1-4 and the non-metallocene catalysts of CE1-5 were conducted in the gas-phase in a 2 liter (L) semi-batch autoclave polymerization reactor equipped with a mechanical agitator as follows. The reactor was first dried for 1 hour, charged with 200 g of sodium chloride (NaCl) and dried by heating at 100° C. under nitrogen for 30 minutes. After drying, 5 g of silica supported methylaluminoxane (SMAO) was introduced as a scavenger under nitrogen pressure. After adding the SMAO, the reactor was sealed and components were stirred. The reactor was then charged with hydrogen ($H_2$ preload, as indicated below) and hexene ($C_6/C_2$ ratio, as indicated below), then pressurized with ethylene at 100 pounds per square inch (psi). Once the system reached a steady state, the type and amount of polymerization catalyst for each of IE1-4 and CE1-5 was charged into the reactor at 80° C. to start polymerization for each of the catalysts of IE1-4 and CE1-5. The reactor temperature was brought to 93° C. and set at this temperature throughout the 3 hour run. The runs were conducted at: Injection temperature=80° C.; Reaction temperature=93° C.; comonomer=1 hexene; ethylene=220 pounds per square inch (psi); $H_2/C_2$=0.0004; $C_6/C_2$=0.0043; run time 3 hours. At the end of the run, the reactor was cooled down, vented and opened. The resulting product mixture was washed with water and methanol, then dried.

The results for IE1-4 and CE1-4 are shown in Tables 1 and 2.

For each batch reactor run, calculate catalyst activity/polymerization productivity as number of grams dried polyolefin product made per gram of catalyst added (gPE/gcat). Higher values of gPE/gcat indicate higher catalyst activities/polymerization productivities.

Melt temperature (i.e., Tm) can be determined via Differential Scanning Calorimetry according to ASTM D 3418-08. For instance, using a scan rate of 10° C./min on a sample of 10 mg and using the second heating cycle.

Melt index (MI, I21) can be measured in accordance with ASTM D1238 (190° C., 21.6 kg).

Mw, Mn and Mw/Mn are determined by using a High Temperature Gel Permeation Chromatography (Polymer Laboratories), equipped with a differential refractive index detector (DRI). Three Polymer Laboratories PLgel 10 μm Mixed-B columns are used. The nominal flow rate is 1.0 mL/min, and the nominal injection volume is 300 μL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/ml, with lower concentrations being used for higher molecular weight samples. Prior to running each sample the DRI detector is purged. Flow rate in the apparatus is then increased to 1.0 ml/minute, and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation:

$$\log M_X = \frac{\log(K_X/K_{PS})}{a_X+1} + \frac{a_{PS}+1}{a_X+1}\log M_{PS}$$

where the variables with subscript "X" stand for the test sample while those with subscript "PS" stand for PS. In this method, $a_{PS}$=0.67 and $K_{PS}$=0.000175 while $a_X$ and $K_X$ are obtained from published literature. Specifically, a/K=0.695/0.000579 for PE and 0.705/0.0002288 for PP. The concentration, c, at each point in the chromatogram is calculated from the baseline-subtracted DRI signal, $I_{DRI}$, using the following equation: $c=K_{DRI}I_{DRI}/(dn/dc)$ where $K_{DRI}$ is a constant determined by calibrating the DRI, and (dn/dc) is the refractive index increment for the system. Specifically, do/dc=0.109 for polyethylene. The mass recovery is calculated from the ratio of the integrated area of the concentration chromatography over elution volume and the injection mass which is equal to the pre-determined concentration multiplied by injection loop volume.

All molecular weights are reported in g/mol unless otherwise noted. In event of conflict between the GPC-DRI procedure and the "Rapid GPC," the GPC-DRI procedure immediately above shall be used. Further details regarding methods of determining Mw, Mn, MWD are described in US 2006/0173123 page 24-25, paragraphs [0334] to [0341].

Short Chain Branching/comonomer content (wt % c6) is determined using GPC, where the comonomer content incorporated in the polymers (weight %) is determined by rapid FT-IR spectroscopy on the dissolved polymer in a GPC measurement. For instance, comonomer content is determined with respect to polymer molecular weight by use of an infrared detector such as an IR5 detector in a gel permeation chromatography measurement, as described in Analytical Chemistry 2014, 86(17), 8649-8656. "Toward Absolute Chemical Composition Distribution Measurement of Polyolefins by High-Temperature Liquid Chromatography Hyphenated with Infrared Absorbance and Light Scattering Detectors" by Dean Lee, Colin Li Pi Shan, David M. Meunier, John W. Lyons, Rongjuan Cong, and A. Willem deGroot. Analytical Chemistry 2014 86 (17), 8649-8656.

TABLE 1

| | Precatalyst compound | Precatalyst (g) | Support (g) | Activator (g) | Toluene (g) | Additive (structure) | Additive amount (mg/uL) |
|---|---|---|---|---|---|---|---|
| CE1 | 1 | 0.155 | 2.65 | 22 | 75 | None | None |
| IE1 | 1 | 0.155 | 2.65 | 22 | 75 | (PIC1) | 28 mg |
| IE2 | 1 | 0.155 | 2.65 | 22 | 75 | (PIC2) | 32 mg |
| IE3 | 1 | 0.155 | 2.65 | 22 | 75 | (PIC3) | 32 mg |
| IE4 | 1 | 0.079 | 1.33 | 11 | 37.5 | (PIC4) | 21 uL |
| CE2 | 1 | 0.155 | 2.65 | 22 | 75 | AD1 | 21 mg |
| CE3 | 1 | 0.052 | 0.88 | 25 | 7.3 | AD2 | 9 uL |
| CE4 | 1 | 0.079 | 1.33 | 11 | 37.5 | AD3 | 16 uL |

| | Loading | Yield (g) | Productivity (gPE/gcat) | I21 | Mn | Mw | Mw/ Mn | wt. % c6 | Tm (° C.) |
|---|---|---|---|---|---|---|---|---|---|
| CE1 | 10.1 | 63.8 | 6315 | 0.39 | 68,569 | 416486 | 6.07 | 0.53 | 128.7 |
| IE1 | 10.7 | 104.9 | 9795 | 0.29 | 77153 | 441024 | 5.72 | 0.94 | 129.9 |
| IE2 | 10.3 | 118.6 | 11514 | 0.44 | 78458 | 434070 | 5.53 | 1.44 | 129.2 |
| IE3 | 10.3 | 113.0 | 10968 | 0.33 | 78495 | 425220 | 5.42 | 2.38 | 129.5 |
| IE4 | 10.5 | 108.0 | 10287 | 0.21 | 112087 | 456127 | 4.07 | 1.64 | * |
| CE2 | 10.4 | 64.2 | 6171 | 0.33 | 76710 | 453898 | 5.92 | 1.30 | 130.5 |
| CE3 | 10.1 | 34.8 | 3444 | 0.24 | 45868 | 367793 | 8.02 | 2.14 | 129.8 |
| CE4 | 10.3 | 60.1 | 5835 | 0.22 | * | * | * | * | * |

*indicates a test was not conducted.

Each of IE1-4 demonstrates the methods employing a productivity-increasing organic compound surprisingly and unexpectedly chemically convert a non-metallocene precatalyst into a productivity enhanced non-metallocene catalyst. For instance, IE1-4 each realized improved (e.g., greater) yields and improved (e.g., greater) productivities than each of CE1-4, while still producing high molecular weight polymers with similar properties (e.g., with similar Mn, Tm) to polymer produced by the comparative catalysts.

The invention claimed is:

1. A method of making an productivity enhanced non-metallocene catalyst, the method comprising combining a first non-metallocene precatalyst, an effective amount of an activator, and an effective amount of a productivity-increasing organic compound under conditions effective for the activator and the productivity-increasing organic compound to chemically convert the first non-metallocene precatalyst into the productivity enhanced non-metallocene catalyst; wherein the productivity-increasing organic compound is of formula (A):

(formula A)

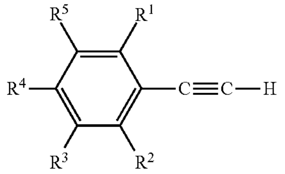

wherein each of $R^5$, $R^4$ and $R^3$ independently is H, a halogen, or a $(C_1\text{-}C_{20})$hydrocarbyl; with the proviso that at least one of $R^5$ and $R^3$ is a halogen or a haloalkyl; wherein each of $R^2$ and $R^1$ independently is H, a halogen, or a $(C_1\text{-}C_{20})$hydrocarbyl, wherein each $(C_1\text{-}C_{20})$hydrocarbyl independently is unsubstituted or substituted with from 1 to 4 substituent groups $R^S$; wherein each substituent group $R^S$ is independently selected from halogen, unsubstituted $(C_1\text{-}C_5)$alkyl, —C═CH, —OH, $(C_1\text{-}C_5)$alkoxy, —C(═O)-(unsubstituted $(C_1\text{-}C_5)$alkyl), —$NH_2$, —N(H)(unsubstituted $(C_1\text{-}C_5)$alkyl), —N(unsubstituted $(C_1\text{-}C_5)$alkyl)$_2$, —COOH, —C(═O)—$NH_2$, —C(═O)—N(H)(unsubstituted $(C_1\text{-}C_5)$alkyl), —C(═O)—N(unsubstituted $(C_1\text{-}C_5)$alkyl)$_2$, —S-(unsubstituted $(C_1\text{-}C_5)$alkyl), —S(═O)$_2$-(unsubstituted $(C_1\text{-}C_5)$alkyl), —S(═O)$_2$—$NH_2$, —S(═O)$_2$—N(H)(unsubstituted $(C_1\text{-}C_5)$alkyl), —S(═O)$_2$—N(unsubstituted $(C_1\text{-}C_5)$alkyl)$_2$, —C(═)S-(unsubstituted $(C_1\text{-}C_5)$alkyl) and —COO (unsubstituted $(C_1\text{-}C_5)$alkyl).

2. The method of claim 1 wherein one of $R^5$ and $R^3$ is a halogen and the other of $R^5$ and $R^3$ is H or a $(C_1\text{-}C_{20})$ hydrocarbyl; or wherein each of $R^5$ and $R^3$ is a halogen or haloalkyl.

3. The method of claim 1 wherein each of $R^2$ and $R^1$ is H.

4. The method of claim 1 wherein $R^4$ is a halogen or H.

5. The method of claim 1 wherein the method further comprises combining the first non-metallocene precatalyst, the effective amount of an activator, the effective amount of a productivity-increasing organic compound, a support material, and an inert hydrocarbon solvent to make a mixture, and removing the inert hydrocarbon solvent from the mixture so as to give the productivity enhanced non-metallocene catalyst disposed on the support material.

6. The method of claim 1 wherein the order of the combining step comprises any one of limitations (i) to (iv): (i) combining the first non-metallocene precatalyst with the effective amount of the activator to give a first intermediate mixture that is free of the productivity-increasing organic compound, and then combining the first intermediate mixture with the productivity-increasing organic compound; (ii) combining the first non-metallocene precatalyst with the effective amount of the productivity-increasing organic compound to give a second intermediate mixture, and then combining the second intermediate mixture with the effective amount of the activator; (iii) combining the effective amount of the activator with the effective amount of the productivity-increasing organic compound to give a third intermediate mixture that is free of the first non-metallocene precatalyst, and then combining the third intermediate mixture with the first non-metallocene precatalyst; and (iv) simultaneously combining the first non-metallocene precatalyst, the effective amount of the activator, and the effective amount of the productivity-increasing organic compound.

7. The method of claim 1 wherein the first non-metallocene precatalyst is a non-metallocene precatalyst of formula (I)

(I)

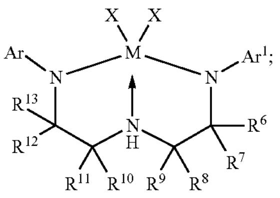

wherein M is a group 4 element, each of $R^6$-$R^{13}$ are independently a hydrogen or a methyl group, Ar is an aryl group or a substituted aryl group, Ar' is an aryl group or a substituted aryl group, and each X is, independently, a hydride group, an amide, a benzyl group, a methyl group, a chloro group, a fluoro group, a methylene(trimethylsilyl) group, a hydrocarbyl group, or a heterohydrocarbyl group.

8. The method of claim 1 wherein the first non-metallocene precatalyst of formula (I) is of compound (1):

(1)

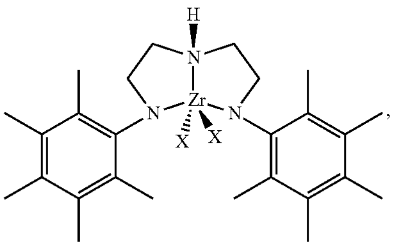

wherein each X is, independently, a hydride group, an amide, a benzyl group, a methyl group, a chloro group, a fluoro group, methylene(trimethylsilyl) group, a hydrocarbyl group, or a heterohydrocarbyl group.

9. The method of claim 1 wherein the metal of the first non-metallocene precatalyst is M, wherein the activator is an organoaluminum compound, and wherein the effective amount of the activator is an Al/M molar ratio of from 0.5 to 10,000, alternatively from 0.95 to 200, alternatively from 1.0 to 150, alternatively from 10 to 100; and/or wherein the effective amount of the productivity-increasing organic compound comprises a molar ratio of productivity-increasing organic compound-to-first non-metallocene precatalyst (PIC/NMC molar ratio) of from 0.5:1.0 to 50.0:1.0, alternatively from 0.9:1.0 to 20.0:1.0, alternatively from 0.9:1.0 to 11:1.0, alternatively from 0.95:1.0 to 6:1.0.

10. A method of making an productivity enhanced non-metallocene catalyst, the method comprising combining a first non-metallocene precatalyst, an effective amount of an activator, and an effective amount of a productivity-increasing organic compound under conditions effective for the activator and the productivity-increasing organic compound to chemically convert the first non-metallocene precatalyst into the productivity enhanced non-metallocene catalyst; wherein the productivity-increasing organic compound is selected from a group consisting of 1-ethynyl-3-fluorobenzene, 1-ethynyl-3,5-difluoorobenzene, 4-ethynl-1,2-difluorobenzene, 1-ethynyl-3,5-bis(trifluoromethyl)benzene, and 3,4,5-trifluorophenylacetylene.

* * * * *